July 6, 1965 R. W. STEVENSON ETAL 3,192,598
METHOD OF MAKING A FILTER ELEMENT
Filed Jan. 3, 1961 2 Sheets-Sheet 1

INVENTORS.
RALPH W. STEVENSON
WILFRED W. LOWTHER
BY Parker & Carter
Attorneys.

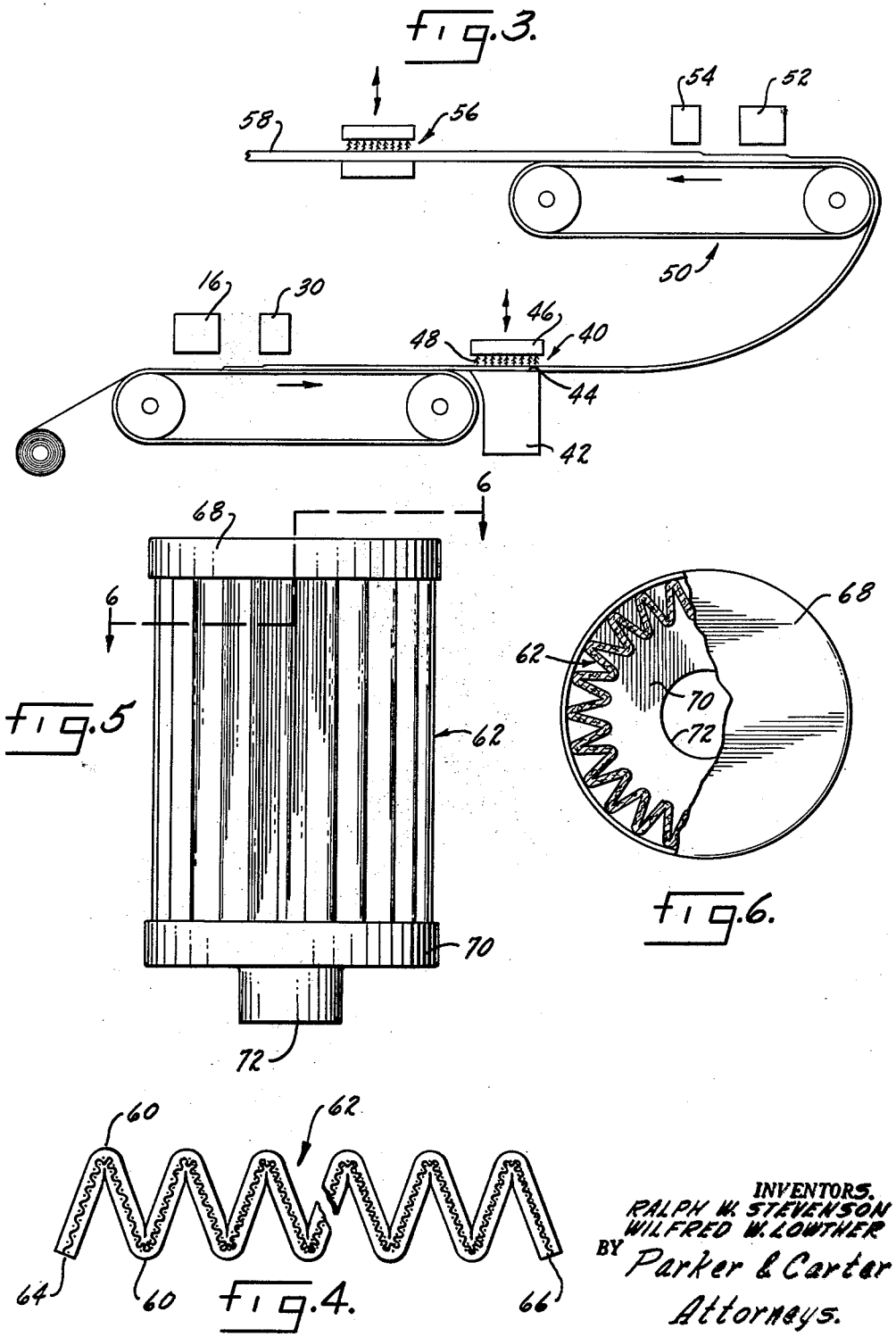

United States Patent Office 3,192,598
Patented July 6, 1965

3,192,598
METHOD OF MAKING A FILTER ELEMENT
Ralph W. Stevenson, Muncie, Ind., and Wilfred W. Lowther, Chicago, Ill., assignors to Novo Industrial Corporation, New York, N.Y., a corporation of New York
Filed Jan. 3, 1961, Ser. No. 80,206
2 Claims. (Cl. 28—72.2)

This invention is in the field of fabrics or filter elements and methods of making them and may be considered to be concerned with what is normally referred to as a dry filter element.

A primary object of the invention is a method of making a fabric or lightweight filter element.

Another object is a method of making a filter element with substantially uniform filtering intensity throughout.

Another object is a dry filter element for use in air cleaners, for example, for automotive use or the like.

Another object is a method of making such filter element which does not increase the basic cost of production.

Another object is a method of making an all dry filter element which does not require extensive gluing or bonding.

Another object is a method of making a filter element of the above type in which the filter fibers are disposed primarily at right angles to the direction of air flow.

Another object is a filter element having increased dimentional stability.

Another object is a lightweight filter element composed of fibers and a metal screen with strength and rigidity.

Other objects will appear from time to time in the ensuing specification and drawings in which:

FIGURE 3 is a schematic of the over-all process;

FIGURE 4 is an end view of a pleated sheet;

FIGURE 5 is a side view of a finished filter element; and

FIGURE 6 is a section along line 6—6 of FIGURE 5.

Figure 1:
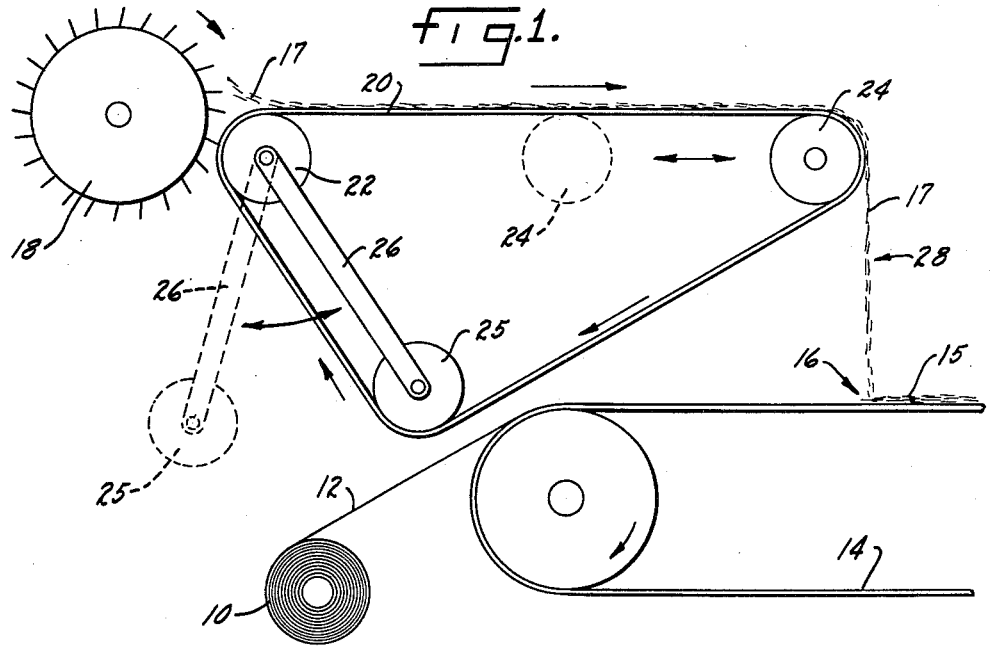
FIGURE 1 is a schematic of a part of the initial part of the process or method.

In FIGURE 1, a suply roll of a metallic screen mesh of any given length and width is indicated generally at 10. For example, it might be aluminum, stainless steel, copper, or the like. In any event, the mesh is generally of the character, as to size of opening, strand size, strength, etc. of commonly used window screen. It should also be made of a material which is capable of taking a set, when bent, creased, or otherwise formed or drawn.

A length 12 of the screen mesh is led from the supply roll to a continuous traveling belt or conveyor 14, the top throw of which moves from left to right, as indicated by the arrows in FIGURE 1, with the mesh on top of the belt, both traveling at the same or approximately the same speed.

At a given point on the belt, we apply what shall be referred to as an initial layer 15 of fibers on top of the metal mesh. We shall refer to this as the first depositing station, designated generally 16 in FIGURE 1. The fibers 17 may come from a conventional carding cylinder, designated generally 18, and are carried to the depositing station by a conveyor belt 20 which runs over a stationary roller 22 next to the carding cylinder and then out to a traveling roller 24 which moves back and forth between inner and outer positions, as shown in FIGURE 1. After passing around the traveling roller 22, the belt passes down under a swinging roller 25 mounted on the arm or arms 26 which may be pivoted on the shaft of roller 22. The arm and swinging roller are adapted to oscillate back and forth between the two positions shown with the traveling roller 24 reciprocating back and forth, at the same time, between its two positions. At all times, the conveyor belt is relatively taut about the three rollers. The drive for the conveyor belt and the mechanism for oscillating and reciprocating the various rollers have not been shown and it should be understood that it may be conventional. Also, since the drawings are schematic, no supports and framework have been shown for the various parts, for purposes of clarity.

The result of the traveling roller reciprocating back and forth between its inner and outer positions with the conveyor belt running at all times is that the fibers falling over the end of the conveyor belt around the traveling roller, as at 28, will be deposited or positioned on top of the moving metallic screen or mesh in a pattern which travels back and forth in the direction of movement of the mesh and conveyor. Since the fibers individually pass through a free fall, they will lie flat on top of the screen mesh and will be individually and collectively oriented or disposed in a plane generally parallel to the mesh. Depending upon the speed or rate of travel of the conveyor 14 and the speed of oscillation of the traveling roller 24, we may gauge the depth or thickness of the layer or layers deposited or positioned on the mesh along with the amount of overlap from one layer to the next, if more than one is used.

Figure 2:
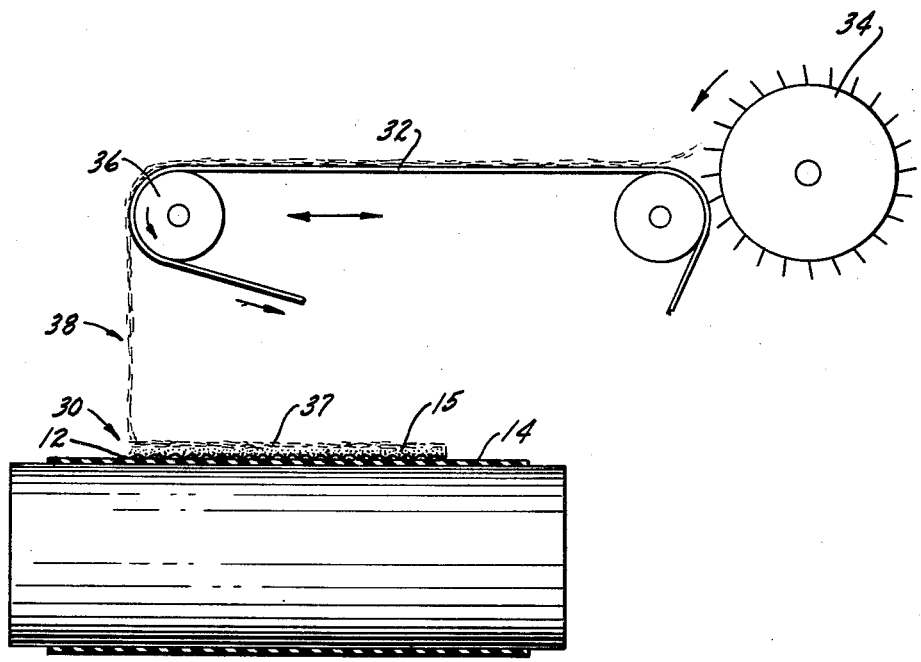
FIGURE 2 is a schematic of another phase or step of the method.

The mesh with the initial layer 15 of the fibers next passes under a second depositing station 30, shown more in detail in FIGURE 2, which includes an overhead conveyor 32 bringing fibers from a conventional carding cylinder 34 or the like and dropping them over the edge of a roller 36 to form a second layer 37. This conveyor at one end has a roller 36 which may move back and forth laterally across the main conveyor at any suitable speed so that the fibers, as at 38, passing over the edge of roller 36 are deposited crosswise or at 90° to the fibers in the initial layer beneath them. The structure may be the same as in FIGURE 1.

As shown in FIGURE 3, the metal mesh with the fibers deposited on top of it at 90° or criss-crossed to each other is next led to what we refer to as the first needling station, designated generally 40, which may include an anvil or base 42 with a resilient or flexible upper surface 44. A head 46 mounted above the mesh is adapted to move up and down and has a plurality of needles projecting down from its lower surface, as at 48. Each needle may have a plurality of downwardly and outwardly disposed barbs, around the shaft of the needle. The needles as a group pass down through the criss-crossed fibers and through the metal mesh. A part of some of the fibers are carried through the openings in the mesh by the barbs. The result is that not only are the fibers interlocked with the strands of the mesh, but also the various fibers are interlocked with each other. But, at the same time, they maintain their general orientation in a plane more or less parallel to the general plane of the metal mesh. This is to say that the needling simultaneously creates a unitary fiber layer and interlocks the thus created layer to the screen or support.

Thereafter, we feed the united layer and mesh to a second conveyor, designated generally 50 in FIGURE 3, in a manner such that the mesh and layer are inverted. This is to say that the fiber layer will now be on the bottom and the metal screen on top. In FIGURE 3, this is done by positioning the second conveyor 50 above the first, and then looping the mesh and layer up and back on top with the second conveyor traveling in the opposite direction to the first, as shown by the arrows. It should be understood, however, that the second main conveyor could as well be below the first with the initial layer and mesh looped down and back. Or any suitable arrangement may be used to invert the initial layer and mesh so that the mesh will be on top again.

At the second conveyor, we position the third and fourth depositing station for fibers, designated generally 52 and 54, at a suitable interval along the length of the conveyor. These may be the same as the first and second stations 16 and 30, with one depositing the fibers in a direction oriented generally parallel to the direction of travel of the conveyor and the other orienting the fibers in a direction generally at right angles or perpendicular to the direction of travel of the conveyor and, therefore, at right angles to the first layer. This is to say that I use at least two stations to deposit the fibers so that as the mesh feeds off of the second main conveyor to a second needling station, designated generally 56 in FIGURE 3, the fibers loosely supported on top of the mesh will be at 90° to each other but all oriented in planes generally parallel to the general plane of the mesh. Stations 52 and 54 may be the same as 16 and 30 and in the same relationship. Or they may be reversed so that the fibers are, first, transversed and then longitudinal. Or we may use a combination.

The second needling station 56 may be the same as the first. The result of passing the barbed needles at this station down through the thus deposited fibers will be to interlock the individual fibers with each other to form a unitary layer and also to interlock the composite layer through the strands of the metallic mesh. In effect, the needling action at this point does three things at once. First, the individual fibers of the upper layer are interlocked with each other so that the individual fibers become a composite layer. Second, the individual fibers and the layer, as a unit, are interlocked through the openings in the screen mesh. And, third, the individual fibers of the second layer, as well as the layer itself, is interlocked with the fibers making up the first layer, now on the bottom. In effect, the two layers on each side of the metal mesh are fully interlocked with each other.

It should be understood that the needling heads extend all the way across both needling stations so that the needling action takes place all the way across. Also, the needling action is sufficiently rapid, relative to the speed of movement of the belt, so that all parts of the layers in the mesh are fully interlocked. This may be followed with a quick steam application to shrink the fibers somewhat on the metal mesh.

The result is a composite sheet 58 of filter fibers fully and completely interlocked through a metal mesh. The interlock is not completely vertical or at right angles to the plane of the mesh, but it may be considered to be substantially so. In a sense, it may be considered a single layer with a metal mesh in the center. Or it might be characterized as two layers fully interlocked with each other through a metal mesh without any adhesives or any heating and bonding.

The composite sheet may then be cut to suitable lengths by any suitable slicing or severing machine after the second needling process so that uniform lengths or sheets are provided. We then may fold and crease the sheets along generally parallel lines, each fold being opposite to the previous one, as shown on edge in FIGURE 4. The bending and creasing may be done by any suitable creasing machine and the particular unit used is not important to the present invention. The creases may be applied by hand, for that matter. In any event, the alternate creases, designated generally 60 in FIGURE 4, are generally uniformly spaced along the panel or sheet with the result that an accordian pleated panel 62 is provided of any given length and width.

Thereafter, we take the end edges 64 and 66, in FIGURE 4, and loop them back, one way or the other, and join them together in any suitable manner, such as by gluing or a heat seal, to provide a cylindrical tube with a suitable diameter and length. The ends of the thus formed tube are closed by end caps, shown at 68 and 70 in FIGURE 5, with at least one having an outlet for clean air, as at 72. The caps may be made entirely or partially of plastic. And we find it convenient to bond the exposed edges of the accordian pleated tube into the end caps with a plastisol so that a full tight seal is provided to prevent air leakage.

The use, operation and function of the invention are as follows:

We are concerned with a method of making a fabric. When used as a filter element, it would preferably be of the all dry type. We might use any suitable fibers, such as felt which may be wool, Dacron, viscose, any one of the acetates, Arnel, or the like. Where the term fiber is used herein, such an interpretation should be given to it. We prefer to use what is commonly referred to as long strand fibers. As an example, the individual fibers might be on the order of one inch in length. But this may vary substantially.

In addition to the method of making the fabric, we are also concerned with the fabric itself, or when used with the filter element, with the filter element itself.

Basically, we position a rigidizing mesh in the middle of a fibrous layer which may be a suitable filter material. Or mesh is positioned between two layers which are then interlocked through the mesh. In any event, the result is a composite fabric sheet which is self-sustaining under appreciable load and has sufficient dimensional stability and workability to have many different applications. The composite sheet will have the appearance of otherwise flexible and unstable fabrics and the rigidity and stability of metals, woods, laminates and the like. It will not require framing for support, and it may be worked by methods and machines normally considered conventional for metal working, such as in presses, between dies, crimping, shearing, cutting, etc.

In the form shown, we accordian pleat the composite sheet and then circle it into a cylinder sealing the ends to form a filter element. It should be understood that we have successfully drawn the sheet into a dish or cup shape. In fact, the dimensional stability gained from the metal mesh will allow the sheet to be formed in the housing itself, or any desired portion thereof, as well as the element.

When used as a filter element prior to this invention, fibrous sheets have been positioned between two metal screens, and then the over-all sandwich bent into the pleated shape, looped into a tube, and sealed into a filter element. But this has proved expensive because twice as much screen is required as is actually necessary for the dimensional stability and rigidity required. Also, the double layers of metal mesh are difficult to cut and, when severed, they pinch or compress the layers of felt fibers between them. In addition to shearing difficulties, the double screens with the felt between are also very hard to pleat with any degree of accuracy. In addition, the double metal mesh makes the sheet difficult to work, thereby increasing machinery, handling and forming costs.

We reverse the situation by positioning a single metal mesh between two layers or in the middle of one layer. The result is that after such a composite sheet is pleated and formed into a filter element, such as shown in FIGURES 5 and 6, both the inner and outer surfaces of the element will be smooth, homogeneous, felt fibers. The metal screen will be fully enclosed in the middle. The single metal screen will have the necessary dimensional stability and rigidity to fully support the end caps.

Such a fabric sheet has tremendously increased workability and involves a tremendous cost saving, not only due to the fact that one metal mesh has been eliminated, but also it can be handled and worked with simpler, less complicated equipment.

We prefer that the mesh be of a type that will not corrode, for example aluminum, copper, or stainless steel. But, in any event, it should be of a material which, when creased or formed will take a permanent set. For example, very few if any of the plastics would work since their "plastic memory" causes them to come out of the pleats. Plastic might be used in rare instances if the creases could be quickly and economically heated or otherwise treated to take a permanent set.

But we prefer metal, first, due to the simplicity and availability and, second, economy.

We have shown the sheet in pleated form in FIGURE 4, but it should be understood that a flat panel may be used, either as a decorative fabric, or as a filter element or medium.

When used in a pleated filter element, no additional structural support, such as perforated or expanded metal mesh, is required between the end caps, which is the case in a pleated paper filter. We also have the advantage that the sheet will not bulge due to ordinary back firing.

Whereas we have shown and described the preferred form and suggested various modifications of our invention, it should be understood that suitable additional modifications, changes, substitutions and alterations may be made without departing from the invention's fundamental theme. We, therefore, wish that the invention be unrestricted, except as by the appended claims.

We claim:

1. A method of making a dimensionally stable filter, including the steps of freely dropping fibers in an initial layer on one side of a screen mesh which will take a permanent set, said fibers laying substantially flat and being disposed substantially parallel to the mesh, needling the fibers of the layer to the screen mesh so as to interlock the layer and mesh, inverting the thus interlocked layer and mesh so that the mesh will be on top and the initial layer on the bottom, freely dropping a second layer of fibers on the other side of the mesh, the fibers of the second layer laying substantially flat and being disposed substantially parallel to the mesh, and thereafter needling the fibers of the second layer to the mesh and into the initial layer to interlock both layers to the screen mesh.

2. A method of making a dimensionally stable filter element including the steps of freely dropping fibers from a first station in an initial layer on top of a screen mesh which will take a permanent set, said fibers laying substantially flat and being disposed substantially parallel to the mesh, needling the fibers of the layer to the screen mesh so as to interlock the layer and the mesh, inventing the thus interlocked layer and mesh so that the mesh will be on top and the initial layer on the bottom, freely dropping a second layer of fibers from a second station on top of the mesh, the fibers of the second layer laying substantially flat and being disposed substantially parallel to the mesh and thereafter needling the fibers through the second layer of the mesh and into the first layer to interlock both layers to the screen mesh.

References Cited by the Examiner

UNITED STATES PATENTS

| | | | |
|---|---|---|---|
| 1,314,565 | 9/19 | Billington | 28—72.2 |
| 1,379,703 | 5/21 | Shiner | 28—72.2 |
| 1,529,701 | 3/25 | Hewitt | 28—72.2 |
| 1,706,535 | 3/29 | Marble | 28—72.2 |
| 1,892,210 | 12/32 | Gordon. | |
| 1,978,620 | 10/34 | Brewster | 28—72.2 |
| 2,381,184 | 8/45 | Ripley | 28—72.2 |
| 2,425,235 | 8/47 | Ferrante | 55—514 |
| 2,463,722 | 3/49 | Spraragen | 28—72.2 |
| 2,847,086 | 8/58 | Muller. | |
| 2,959,509 | 11/60 | Marshall | 28—72.2 X |

HARRY B. THORNTON, *Primary Examiner.*

HERBERT L. MARTIN, WALTER BURLOWITZ, *Examiner.*